United States Patent
Guyomard et al.

(10) Patent No.: US 9,287,768 B2
(45) Date of Patent: Mar. 15, 2016

(54) POWER CONVERTER AND PRE-CHARGING CIRCUIT OF SAME

(75) Inventors: Jocelyn Guyomard, Saint Sebastien de Morsent (FR); Heu Vang, Carrieres sous Poissy (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 139 days.

(21) Appl. No.: 14/239,425

(22) PCT Filed: Sep. 14, 2012

(86) PCT No.: PCT/EP2012/068071
§ 371 (c)(1),
(2), (4) Date: Feb. 18, 2014

(87) PCT Pub. No.: WO2013/056918
PCT Pub. Date: Apr. 25, 2013

(65) Prior Publication Data
US 2014/0211524 A1    Jul. 31, 2014

(30) Foreign Application Priority Data

Oct. 17, 2011  (FR) ...................................... 11 59351

(51) Int. Cl.
*H02M 1/36*       (2007.01)
*H02M 5/458*     (2006.01)

(52) U.S. Cl.
CPC ................ *H02M 1/36* (2013.01); *H02M 5/458* (2013.01)

(58) Field of Classification Search
CPC ....... H02M 1/36; H02M 5/453; H02M 5/458; H02M 2001/0054; H02M 2001/322
See application file for complete search history.

(56) References Cited

U.S. PATENT DOCUMENTS

| | | | |
|---|---|---|---|
| 5,459,652 A | 10/1995 | Faulk | |
| 5,574,632 A | 11/1996 | Pansier | |
| 5,973,419 A * | 10/1999 | Kruppa | ................. H02H 9/001 307/131 |
| 7,932,636 B2 * | 4/2011 | Li | .......................... H02M 1/36 307/66 |
| 7,948,780 B2 * | 5/2011 | Sonobe | ................... H02M 1/36 363/21.08 |
| 2014/0376277 A1 * | 12/2014 | Tsui | ................. H02M 3/33523 363/21.12 |

OTHER PUBLICATIONS

International Search Report Issued Oct. 15, 2012 in PCT/EP12/068071 Filed Sep. 14, 2012.

* cited by examiner

*Primary Examiner* — Matthew Nguyen
(74) *Attorney, Agent, or Firm* — Oblon, McClelland, Maier & Neustadt, L.L.P.

(57) ABSTRACT

A power converter configured to control an electrical load including a supply DC bus, a bus capacitor, a pre-charging circuit of the bus capacitor provided with a limiting resistor, a switched-mode power supply, and a starter assembly of the switched-mode power supply. The power converter includes a selection mechanism configured to connect the supply DC bus either, in a first state, to the starter assembly of the switched-mode power supply or, in a second state, to the bus capacitor to short circuit the limiting resistor.

3 Claims, 2 Drawing Sheets

POWER CONVERTER AND PRE-CHARGING CIRCUIT OF SAME

FIELD

The present invention relates to a power converter and to its pre-charging circuit.

BACKGROUND

In a known manner, a power converter mainly includes:
a DC power bus connected to a DC voltage source and including a positive power line and a negative power line,
a bus capacitor connected to the positive power line and to the negative power line,
an inverter module connected to the DC power bus and equipped with a plurality of switching arms, controlled to provide a variable voltage to an electrical load,
a pre-charging circuit for the bus capacitor including a limiting resistor, also called pre-charge resistor, connected to the power line and to the bus capacitor, and a pre-charge relay connected in parallel with the limiting resistor, said pre-charge relay being controlled to close when the charging of the bus capacitor is finished.

A power converter can also include a rectifier module connected, on the one hand, to an electrical power source providing an AC voltage and, on the other hand, to the DC power bus.

To control a power converter, it is known to use a switch mode power supply incorporated into the power converter. This switch mode power supply uses a start-up assembly.

A power converter is also known from U.S. Pat. No. 5,459,652.

SUMMARY

The object of the invention is to propose a power converter in which the start-up assembly of the switch mode power supply and the pre-charging circuit of the bus capacitor contribute to reducing the losses of the converter.

This object is achieved by a power converter intended to control an electrical load including:
a DC power bus equipped with a positive power line and a negative power line,
a bus capacitor,
a limiting resistor connected to the positive power line and to the bus capacitor, said bus capacitor being connected to the negative power line,
a switch mode power supply,
a start-up assembly of the switch mode power supply connected to the negative power line of the DC power bus, the converter including:
selection means arranged to connect the positive power line, either, in a first state, to the start-up assembly of the switch mode power supply, or, in a second state, to the bus capacitor to short-circuit the limiting resistor,
a control unit being arranged to control the selection means in the first state or in the second state.

According to a particularity, the start-up assembly of the switch mode power supply includes a start-up resistor and a capacitor connected in series, and a Zener diode connected in parallel with said capacitor.

According to another particularity, the converter includes a discharge resistor connected in parallel with the start-up assembly of the switch mode power supply.

BRIEF DESCRIPTION OF THE DRAWINGS

Other characteristics and advantages will appear in the following detailed description, with reference to an embodiment give by way of example and represented in the appended drawings defined below.

DETAILED DESCRIPTION

Figure 1:
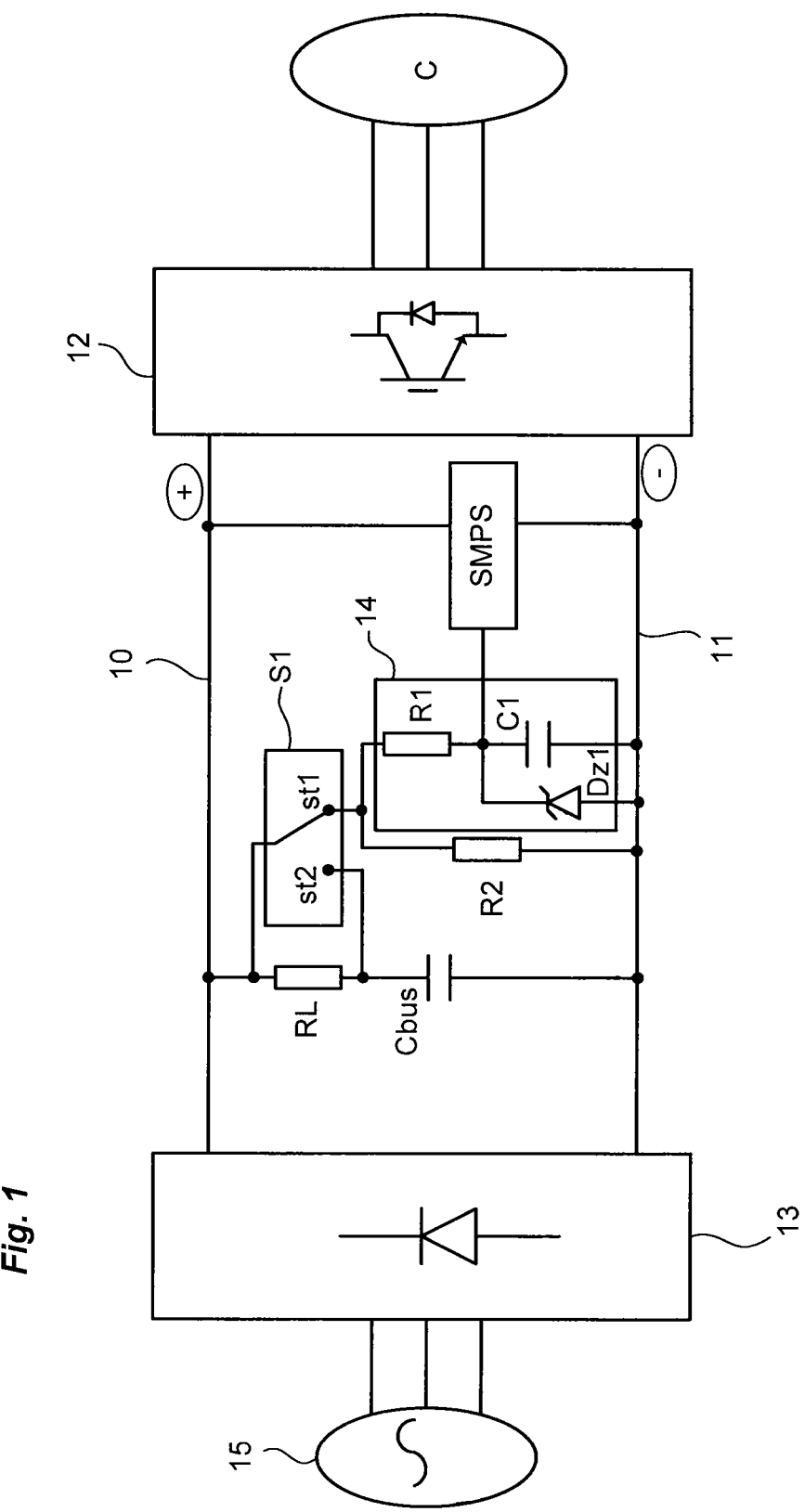
FIG. 1 represents the power converter of the invention.

With reference to FIG. 1, a power converter mainly includes:
A DC power bus connected to a DC voltage source and including a positive power line 10 and a negative power line 11.
A bus capacitor Cbus connected to the positive power line 10 and to the negative power line 11 and intended to maintain the bus voltage at a constant value. Some converters can include a plurality of bus capacitors connected in series.
An inverter module 12 including several switching arms, each switching arm including at least two transistors, the inverter module being intended to provide a variable voltage to an electrical load C connected to the power converter.

A power converter can also include a voltage rectifier module 13 connected, on the one hand, to an electrical power source 15 providing an AC voltage and, on the other hand, to the DC power bus to provide a DC voltage to said bus. With the rectifier module 13, the power converter performs the function of variable-speed drive.

Figure 2:
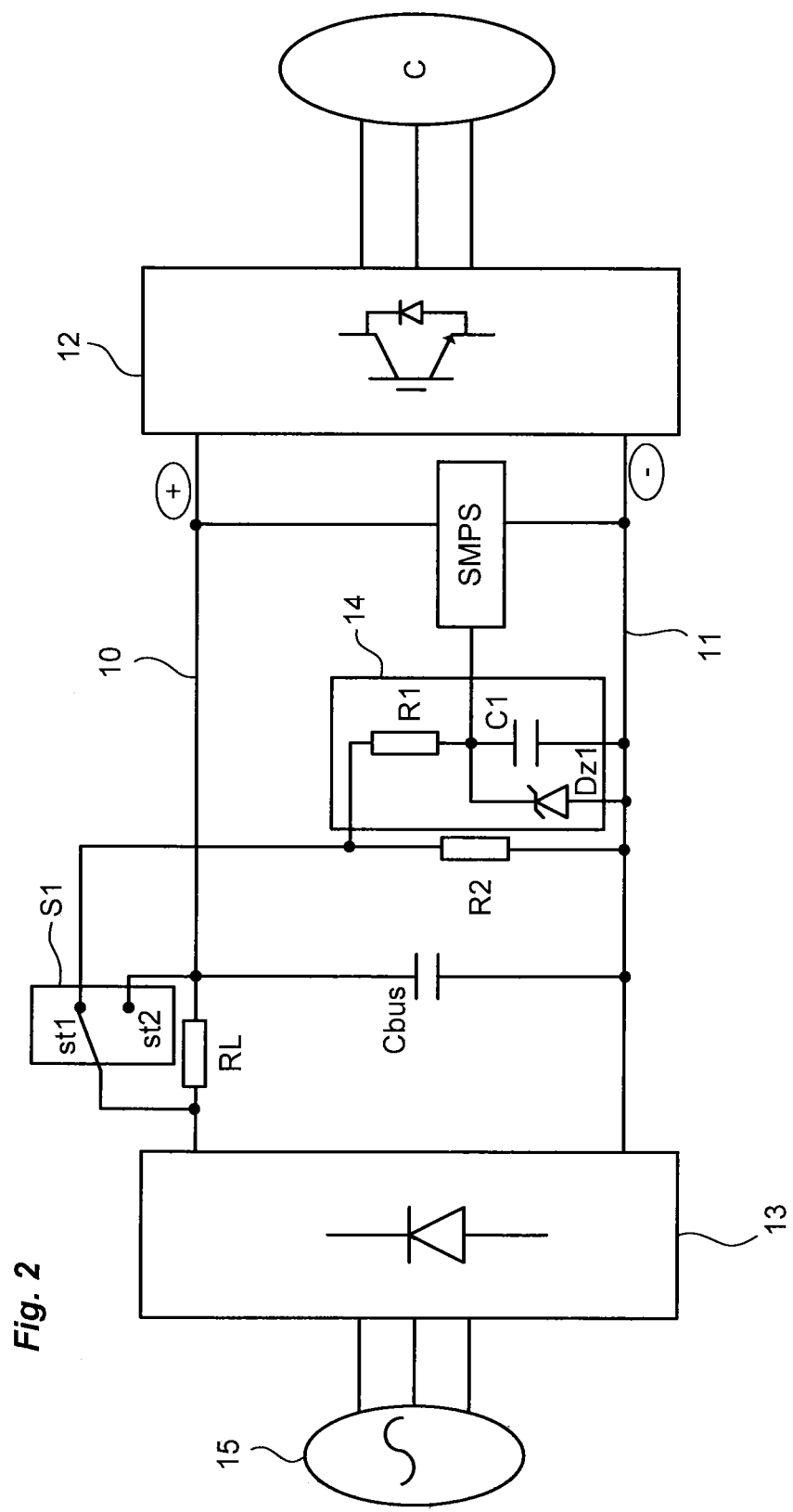
FIG. 2 represents the power converter of the invention in a variant embodiment.

A power converter also includes a pre-charging circuit for the bus capacitor Cbus. This pre-charging circuit is used to limit the charge current provided to the bus capacitor Cbus upon starting the variable-speed drive. This pre-charging circuit is composed of a limiting resistor RL, also called pre-charge resistor, and of a relay, called pre-charge relay, connected in parallel with the limiting resistor RL and intended to short-circuit the limiting resistor RL once the charging of the bus capacitor Cbus is finished. The pre-charging circuit, composed of the limiting resistor RL and of the pre-charge relay, is usually connected, on the one hand, to the positive line of the DC power bus and, on the other hand, to the bus capacitor. The limiting resistor RL and the pre-charge relay being positioned in the pre-charging circuit of the bus capacitor Cbus, they can be connected directly in series with the bus capacitor Cbus (as in FIG. 1) or positioned in series on the positive power line 10 of the DC power bus (as in FIG. 2).

Moreover, the power converter also includes a switch mode power supply (SMPS). The switch-mode power supply SMPS is powered by the voltage provided by the DC power bus and is used to power the auxiliary circuits and the transistor monitoring and control part. As long as the DC power bus has not reached a sufficient voltage, the inverter module cannot be controlled.

To start up the switch mode power supply, it is known to use a start-up assembly 14 including a start-up resistor R1, a capacitor C1 connected in series and a Zener diode Dz1 connected in parallel with the capacitor C1 to limit the voltage of the latter. This assembly is intended to be connected to the positive power line 10 of the bus and to the negative power line 11 of the bus. It makes it possible to power the monitoring circuit of the switch mode power supply and to apply a voltage across the terminals of the switch mode power supply SMPS so that the latter can start up. Once the switch mode power supply has finished starting up, the start-up assembly 14 is disconnected from the bus and the switch mode power supply SMPS is powered normally by the bus via two connection lines connected to the two power lines 10, 11 of the bus.

The object of the invention is to pool the short-circuiting function of the limiting resistor RL of the pre-charging circuit and the disconnection of the start-up assembly 14. Indeed, the pre-charging circuit and the start-up assembly become unnecessary at the same time, i.e. when the charging of the bus capacitor Cbus is finished. The invention therefore consists in using a single relay S1 to perform both functions. This relay S1 is controlled between two states by a control unit 16, a first state st1 in which the charge current of the bus capacitor Cbus passes through the limiting resistor RL and the start-up resistor R1 of the start-up assembly 14, and a second state st2 in which the limiting resistor RL is short-circuited and the start-up assembly 14 disconnected from the positive power line 10 of the DC power bus. To fulfill the two functions described above, the relay S1 used will be of the SPDT (Single Pole Double Throw, as shown in FIG. 1) type, for example. The relay S1 is connected to the positive power line 10 of the DC power bus and includes two poles, each of the poles defining one of the states st1, st2. According to the invention, the power converter can also include a discharge resistor R2 connected in parallel with the start-up assembly 14. This discharge resistor R2 makes it possible to quickly discharge the bus capacitor Cbus when the power converter is switched off and to avoid additional losses when this resistor R2 is permanently plugged into the terminals of the bus capacitor Cbus. This discharge resistor R2 is connected to the bus when the relay S1 is in its first state st1.

The invention claimed is:

1. A power converter configured to control an electrical load, comprising:
    a DC power bus including a positive power line and a negative power line;
    a bus capacitor;
    a limiting resistor connected to the positive power line and to the bus capacitor, the bus capacitor being connected to the negative power line;
    a switch mode power supply connected to the positive power line and to the negative power line;
    a start-up assembly of the switch mode power supply connected to the negative power line of the DC power bus;
    selection means configured to connect the positive power line, either, in a first state, to the start-up assembly of the switch mode power supply, or, in a second state, to the bus capacitor to short-circuit the limiting resistor; and
    a control unit configured to control the selection means in the first state or in the second state.

2. The power converter as claimed in claim 1, wherein the start-up assembly of the switch mode power supply includes a start-up resistor and a capacitor connected in series, and a Zener diode connected in parallel with the capacitor.

3. The power converter as claimed in claim 1, further comprising a discharge resistor connected in parallel with the start-up assembly of the switch mode power supply.

* * * * *